(12) United States Patent
Chu et al.

(10) Patent No.: US 12,742,716 B2
(45) Date of Patent: Sep. 22, 2026

(54) OPTO CHIP-BASED VISCOMETER

(71) Applicants: UNIVERSITY OF HONG KONG VERSITECH LIMITED, Pokfulam (CN); Southern University of Science and Technology, Shenzhen (CN)

(72) Inventors: Zhiqin Chu, Hong Kong (CN); Yumeng Luo, Shenzhen (CN); Kwai Hei Li, Shenzhen (CN)

(73) Assignees: UNIVERSITY OF HONG KONG VERSITECH LIMITED, Pokfulam (HK); Southern University of Science and Technology, Shenzhen (CN)

( * ) Notice: Subject to any disclaimer, the term of this patent is extended or adjusted under 35 U.S.C. 154(b) by 242 days.

(21) Appl. No.: 18/588,142

(22) Filed: Feb. 27, 2024

(65) Prior Publication Data

US 2024/0295482 A1 Sep. 5, 2024

(30) Foreign Application Priority Data

Mar. 1, 2023 (CN) ........................ 202310187055.7

(51) Int. Cl.
*G01N 11/10* (2006.01)

(52) U.S. Cl.
CPC .................................. *G01N 11/10* (2013.01)

(58) Field of Classification Search
None
See application file for complete search history.

(56) References Cited

U.S. PATENT DOCUMENTS 5,572,321 A * 11/1996 Pinier .................... G01N 21/49 356/338
7,821,641 B2 * 10/2010 Wagner .................. G01N 21/05 356/246
2022/0003650 A1 1/2022 Macdonald

OTHER PUBLICATIONS

Cakmak et al. “Microcantilever based disposable viscosity sensor for serum and blood plasma measurements.” Methods. 2013;63(3):225-232. 8 pages.
Chaudhary et al. “Universal Stokes’s nanomechanical viscometer.” Sci Rep. 2021; 11: 14365. 9 pages.

(Continued)

*Primary Examiner* — Peter J Macchiarolo
*Assistant Examiner* — Jermaine L Jenkins
(74) *Attorney, Agent, or Firm* — Leason Ellis LLP

(57) ABSTRACT

An opto chip for detecting a physical parameter of a liquid sample, comprising an optical structure monolithically integrated with a substrate layer and a functional layer, wherein the substrate layer is light-transmissive and configured to have an upper surface for receiving a droplet of the liquid sample and a lower surface bonded to the functional layer; and the functional layer comprises a light-emitting region and a light-detecting region with the light-emitting region being configured to emit measurement light. The light-detecting region is configured to receive reflected light derived from the measurement light and a signal reflecting the change in intensity thereof is converted into a photocurrent signal. A viscometer and detection method operated using the same opto chip technique. The need for complex external optical calibration is thus eliminated, making the viscometer easier to operate and reducing the overall size of the device.

17 Claims, 5 Drawing Sheets

(56) References Cited

OTHER PUBLICATIONS

Nguyen et al. "Viscosity measurement based on the tapping-induced free vibration of sessile droplets using MEMS-based piezoresistive cantilevers." Lab Chip. 2015; 15: 3670. 7 pages.
Taguchi et al. "Micro optical viscosity sensor for in situ measurement based on a laser-induced capillary wave." J Therm Science Tech. 2009; 4(1): 98-108. 11 pages.

* cited by examiner

OPTO CHIP-BASED VISCOMETER

CROSS-REFERENCE TO RELATED PATENT APPLICATIONS

This application claims the benefit of priority under 35 U.S.C. Section 120 of Chinese Patent Application No. 2023101870557 filed Mar. 1, 2023, which is incorporated herein by reference in its entirety.

TECHNICAL FIELD

The invention belongs to the field of detection equipment, and specifically relates to an optical semiconductor circuit ("opto chip") for detecting the physical parameters of a liquid sample, a viscometer and a detection method using the opto chip.

BACKGROUND ART

Viscosity is one of the important physical properties of liquids. Viscosity measurement is an indispensable task in many practical applications. For example, in industries, like food manufacturing and product production, viscosity monitoring is often used to control the impregnation and coating process of fluids to improve product quality. Furthermore, viscosity measurement plays an important role in biomedical and clinical applications, such as blood viscosity for the detection of cardiovascular diseases. The characterization of antibody solutions and protein-based drugs, as well as for DNA analysis, also rely on viscosity.

Many techniques have been developed to meet the needs of viscosity measurement, including the capillary method, falling ball method, vibration method, rotation method, plate method and so on.

The capillary method is widely used due to its simplicity and practicality, resulting in a variety of current measuring devices that have been designed based on this method. The capillary method utilizes external pressure to drive a fluid flow through a capillary tube. The pressure difference between the two ends of the tube and the flow rate of the fluid are measured, corrected, and then used to calculate the viscosity of the fluid according to the Hagen-Poiseuille Equation. However, there are several challenges associated with the current devices based on the capillary method for measuring viscosity, including: (1) the requirement for a calibrated reference; (2) the difficulty in accurately measuring pressure difference and flow rate; (3) the need for a significant amount of experimental liquid (with the inner diameter of the capillary typically being in the order of mm and the required experimental liquid being tens of milliliters), which can be problematic when only a limited amount of liquid is available (blood or some physiological fluid samples are typically only a few tens of microliters); and (4) the difficulty in cleaning the capillary. These challenges made the development of capillary measurement technology difficult. Therefore, there is an urgent need to develop new technologies and new ideas to address the challenges encountered in the capillary measurement process.

Moreover, it has been acknowledged that other viscosity measurement methods may have their own limitations. For example, for the falling ball method, it is difficult to measure the ball's falling velocity precisely, which causes measurement uncertainty. The vibration methods use optical fiber to detect the amplitude, which is expensive and requires complex optical alignment. The rotation method requires a large apparatus and is not portable.

In particular, current viscosity measurement methods often require a minimum sample size of around milliliters for accurate measurement and can be relatively expensive. Although the viscosity sensing technology based on microfluidics greatly reduces the sample volume, it still requires more than 20 μL to control the steady flow rate or the sample wetting channel, which can increase the error and reduce the reuse rate. Therefore, there is an urgent need to develop a low-cost, miniaturized and portable viscometer.

SUMMARY OF THE INVENTION

The object of this invention is to provide a miniaturized, portable opto chip, viscometer and detection method for physical parameters. This viscometer and detection method can accurately detect physical parameters, such as viscosity, refractive index, and resonant frequency of liquid samples as small as 10 μL of or less.

The present invention is based on the idea of detecting a physical parameter, such as viscosity, refractive index and resonant frequency, of a very small amount of liquid sample, such as 10 μL or less, by recording the changes in photocurrent detected on the physical model shown in FIGS. 1 and 2.

In a first aspect, the present invention provides an opto chip for detecting a physical parameter of a liquid sample. The opto chip comprises an optical structure monolithically integrated with a substrate layer and a functional layer. The substrate layer is light-transmissive and is configured to have an upper surface for receiving droplets of the liquid sample and a lower surface bonded to the functional layer. The functional layer is configured to comprise a light-emitting region and a light-detecting region, where the light-emitting region is configured to emit measurement light from an upper surface of the functional layer, and the light-detecting region is configured to receive reflected light derived from the measurement light. A signal related to the change in intensity of the reflected light is converted into a photocurrent signal.

As used herein, the term "monolithically integrated" means that the light emitting and light detecting components of the opto chip are processed as a single unit, with no additional wiring or alignment between the light emitting and light detecting components. The term "resonant frequency" refers to the resonant frequency of a liquid, that is, the vibration frequency at which a droplet of the liquid reaches its maximum amplitude.

In use, the opto chip according to the present invention is placed on a vibrator which is configured to apply a vertical vibration to it. When the vibrator applies a pulse, the droplet on the opto chip begins to vibrate freely, causing a periodic change in the contact area between the droplet and the opto chip, resulting in a periodic change in the intensity of the reflected light received by the light-detecting region, and in turn causing a change in the photocurrent output from the light-detecting region. When the vibrator stops applying the pulse, the vibration amplitude of the droplet immediately attenuates at a certain rate. The attenuation rate is found to be related to the viscosity of the liquid and the physical parameters of the droplet, such as viscosity, refractive index and resonance frequency, and the attenuation rate can be calculated by recording the attenuation rate of the photocurrent as the vibration amplitude is attenuated. In general, the higher the viscosity of the droplet, the higher the attenuation rate.

In some embodiments of the present invention, the light-emitting region is constituted by a solid light source, such as a light-emitting diode (LED), a laser diode (LD), a surface-emitting laser (VCSEL), etc., preferably a low-cost LED. The light-detecting region is constituted by a light sensor or a light detector, such as a photodiode (PD), a phototransistor, etc.

In a preferred embodiment of the present invention, the substrate layer is formed of a light-transmissive material with high-refractive index, such as sapphire or silicon carbide.

In a preferred embodiment of the present invention, the light-emitting region and the light-detecting region are formed by epitaxial growth on the substrate layer. For example, in some embodiments, the substrate layer is sapphire, and the light-emitting region and the light-detecting region are LEDs epitaxially grown simultaneously on the sapphire substrate layer. After growth, the two regions are formed by using photolithography and/or inductively coupled plasma etching. The LED in the light-emitting region emits light by receiving current from a power supply, and the LED in the light-detecting region, which acts as a photodetector (PD), is used to detect the light emitted by the light-emitting region.

In some embodiments of the present invention, the opto chip further comprises a support base plate disposed vertically below the functional layer and monolithically integrated with the substrate layer and the functional layer. Preferably, the supporting base plate can be made of one or more of a fiberglass plate, an aluminum base plate and a ceramic plate.

In a preferred embodiment of the present invention, the light-emitting region is configured to have a circular shape and is provided at the geometric center of the light-detecting region.

In some embodiments of the present invention, the size of the opto chip in the horizontal direction can be (0.1 mm-10 cm)×(0.1 mm-10 cm). In order to further improve the portability and reduce the cost of the opto chip, the size of the opto chip in the horizontal direction can be set according to the volume of a droplet of the liquid sample. For example, when the volume of the droplet is 50 μl, the size of the opto chip in the horizontal direction can be (5-10 mm)×(5-10 mm). When the volume of the droplets is 5-10 μl, the size of the opto chip in the horizontal direction can be (0.5-2 mm)×(0.5-2 mm).

In some embodiments of the present invention, the size of the substrate layer and the functional layer of the opto chip can be set to, for example, 100 μm-1 mm, preferably 100-500 μm in the thickness direction. In some embodiments of the present invention, the thickness of the support base plate can be 0.5-10 mm, preferably 0.5-1 mm. In some embodiments of the present invention, the longitudinal cross-sectional structure of the opto chip is as shown in FIG. 1, wherein the opto chip 10 includes a substrate layer 11, a hydrophobic layer 13 integrated on the upper surface 112 of the substrate layer, and a functional layer 12 integrated on the lower surface 111 of the substrate layer 11 and constituting a light-emitting region 121 and a light-detecting region 122. In this embodiment, the light-emitting region 121 is configured to have a circular shape at the geometric center of the light-detecting region 122. A droplet 20 of the liquid sample is applied onto the upper surface 112 of the substrate layer 11 and is opposite to the light-emitting region 121 in the vertical direction. When a vertically vibrating pulse is applied to the opto chip 10, the shape of the droplet 20 changes periodically between its highest point form 20*a* and its lowest point form 20*b*.

FIG. 2 is a schematic diagram of the optical mechanism of the opto chip 10. At a point where the droplet 20 is stationary, when a first emitted light beam 121*a* emitted from the light-emitting region 121 is incident on a first point 131 on the contact interface between the substrate layer 11 and the droplet 20, a first reflected light beam 121*b* and a first refracted light beam 121*c* are generated. The first reflected light beam 121*b* is received by the light-detecting region 122. When a second emitted light beam 122*a* emitted from the light-emitting region 121 is incident on a second point 132 on the contact interface between the substrate layer 11 and the air, total reflection occurs and a generated second reflected light beam 122*b* is received by the light-detecting region 122. At a point where the liquid droplet 20 periodically vibrates vertically, the second point 132 periodically appears in two optical states, namely: (i) the contact interface between the substrate layer 11 and the air; and (ii) the contact interface between the substrate layer 11 and the droplet 20. Since the refractive index of the droplet is greater than the refractive index of the air and closer to the refractive index of the substrate layer 11, the intensity of the second reflected light beam 122*b* generated at the second point 132 changes periodically.

In a second aspect, the invention provides a viscometer, which comprises:

- an opto chip, which is the opto chip according to the first aspect of the present invention;
- a vibrator, which is used for providing vertical vibration to the opto chip; and
- a photocurrent signal processing module, which is configured to process the photocurrent signal output from the light-detecting region and calculate the viscosity of a droplet.

In some embodiments of the invention, the vibrator may include a signal generator for applying pulse waves to the vibrator. The photocurrent signal processing module may include signal processing devices such as signal amplifiers and oscilloscopes.

In some embodiments of the present invention, the photocurrent signal processing module can also be configured to process the photocurrent signal output from the light-detecting region and calculate the refractive index and/or resonant frequency of the droplet.

In a third aspect, the present invention provides a method for detecting the viscosity of a liquid sample, the method comprising the steps of:

(1) providing a viscometer as described in the second aspect of the present invention (2) dropping the liquid sample onto a surface of the opto chip to form a droplet;

(3) applying a pulse wave to the vibrator to cause the droplet on the opto chip to vibrate vertically;

(4) acquiring the photocurrent signals output from the light-detecting region during the attenuation of the vibration amplitude of the droplet; and (5) processing the photocurrent information and calculating the viscosity of the droplet by using the photocurrent signal processing module.

According to the method for detecting the viscosity of a liquid sample provided by the present invention, the volume of the droplet of the liquid sample can be 5 μl-1 ml, preferably 5-50 μl, and more preferably 5-10 μl.

According to the method for detecting the viscosity of a liquid sample provided by the present invention, the viscosity of the liquid sample can be 2 to 40 cp.

According to the method for detecting the viscosity of a liquid sample provided by the present invention, wherein in step (3), the frequency of the pulse wave applied to the vibrator can be 10-1000 mHz. The present invention uses a relatively slow frequency to prevent a second pulse wave from starting to vibrate before the droplet attenuation is complete. Preferably, the voltage amplitude of the pulse wave applied to the vibrator can be 0.1-10V. A higher voltage amplitude will cause the droplet to vibrate off the surface, while a lower amplitude will make the signal less noticeable. Preferably, the duty cycle of the pulse wave applied to the vibrator can be 0.01%-1%.

In a fourth aspect, the present invention provides a method for detecting the refractive index of a liquid sample, the method comprising the steps of:

(1) providing a viscometer as described in the second aspect of the present invention;
(2) dropping the liquid sample onto a surface of the opto chip to form a droplet;
(3) applying a pulse wave to the vibrator to cause the droplet on the opto chip to vibrate vertically;
(4) acquiring the photocurrent signals output from the light-detecting region during the attenuation of the vibration amplitude of the droplet; and
(5) analyzing the acquired photocurrent signals, and calculating the refractive index of the liquid sample from the photocurrent intensity according to Snell's law.

Hereinafter, the principle of the refractive index detection method of the present invention will be described with reference to FIG. 2. FIG. 2 is a schematic diagram of the optical mechanism of the opto chip 10. At a point where the droplet 20 is stationary, when a first emitted light beam 121*a* emitted from the light-emitting region 121 is incident on the first point 131 at the edge of the droplet 20 (the optical state at the first point 131 is the contact interface between the substrate layer 11 and the air), a first reflected light beam 121*b* and a first refracted light beam 121*c* are generated, wherein the first reflected light beam 121*b* is received by a light-detecting region 122.

Changes in the refractive index of the droplet 20 cause a corresponding change in the intensity of the first emitted light beam 121*b*, resulting in a different photocurrent signal.

According to Snell's law, the refractive index of the droplet can be calculated based on the photocurrent intensity. This means that the refractive index of an unknown droplet can be calculated from the measured photocurrent values of x amps for the sapphire/air interface and y amps for the sapphire/droplet interface, in combination with the known refractive indices of sapphire and air.

In a fifth aspect, the present invention provides a method for detecting the resonant frequency of a liquid sample, the method comprising the steps of:

(1) providing a viscometer as described in the second aspect of the present invention;
(2) dropping the liquid sample to a surface of the opto chip to form a droplet;
(3) applying a pulse wave to the vibrator causing the droplet on the opto chip to vibrate vertically;
(4) acquiring the photocurrent signals output from the light-detecting region during the attenuation of the vibration amplitude of the droplet; and
(5) subjecting the acquired photocurrent signals to fast Fourier transform to obtain the resonant frequency of the droplets.

According to the method for detecting the resonant frequency of a liquid sample provided by the present invention, after performing Fourier transform on the droplet oscillation signals, it will be found that the droplet oscillations are concentrated at a certain frequency, which is its resonant frequency.

The opto chip, viscometer and detection method provided by the present invention utilize a monolithic integrated opto chip and eliminate the need for complex external optical calibration, making the viscometer easier to operate and reducing the overall size of the device. In addition, the chip-scale viscometer provided by the present invention has a larger detection range.

BRIEF DESCRIPTION OF THE DRAWINGS

The embodiments of the present invention are described in detail with reference to the accompanying drawings, wherein.

DETAILED DESCRIPTIONS OF EMBODIMENTS OF THE INVENTION

The present invention will be described in further detail below in conjunction with specific embodiments. The examples given are only for illustrating the present invention, and are not intended to limit the scope of the present invention.

Example 1

Manufacture of Opto Chips

Figure 9:
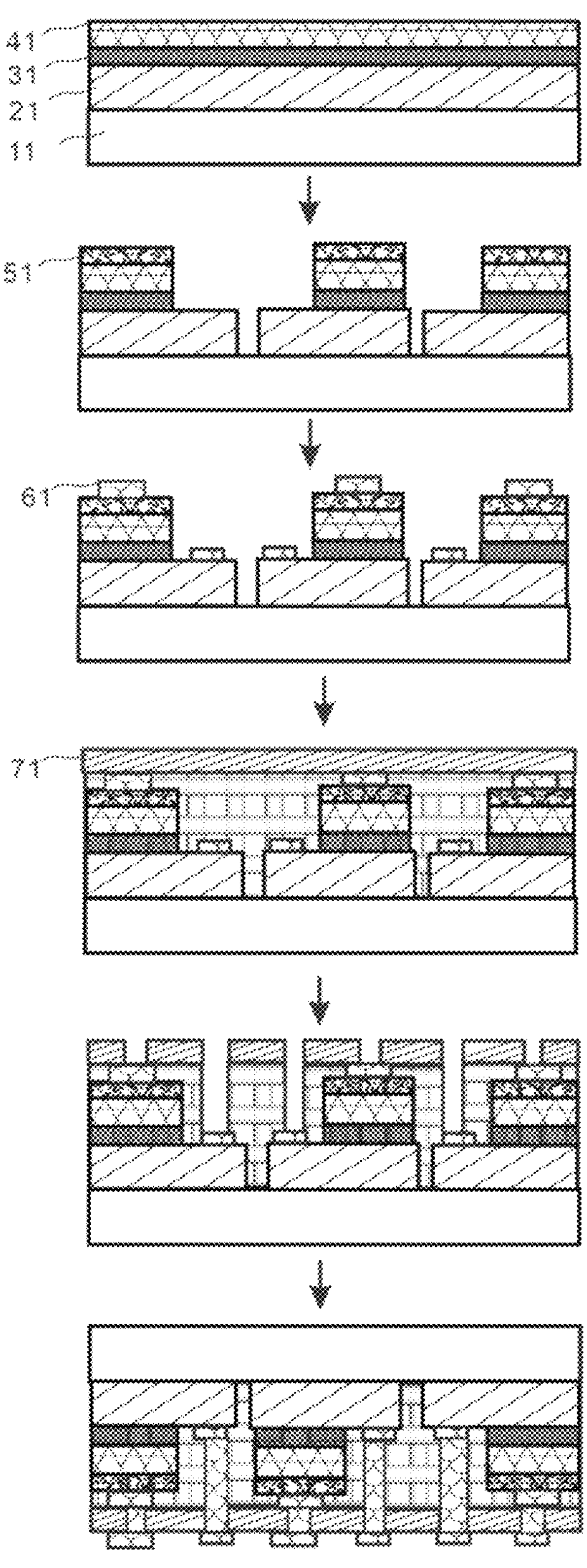
FIG. 9 is a schematic diagram of the process steps of the chip manufacturing process used in Example 1 of the present invention.

Referring to the detailed steps as shown in FIG. 9, the optoelectronic chips are manufactured through wafer-level micro-nano processing technology as described below:

(1) an undoped gallium nitride and N-type gallium nitride layer 21, a quantum well layer 31 and a P-type gallium nitride layer 41 were sequentially deposited on a substrate layer 11 by chemical vapor deposition of metal organic compound;
(2) a light-emitting region and a light-detecting region were formed by photolithography and inductively coupled plasma etching, and then a layer of tin-doped indium oxide 51 was deposited;
(3) an electrode layer 61 was deposited by electron beam evaporation;

(4) a Bragg emitting layer 71 was formed by chemical vapor deposition;

(5) the electrode layer was exposed by photolithography and inductive plasma etching; and (6) the electrode layer material deposition was continued through electron beam evaporation, with the process being controlled to allow the electrode layer to build up beyond the uppermost surface layer, thus ensuring that the electrodes were sufficiently protruding from the outer layer.

Figure 1:
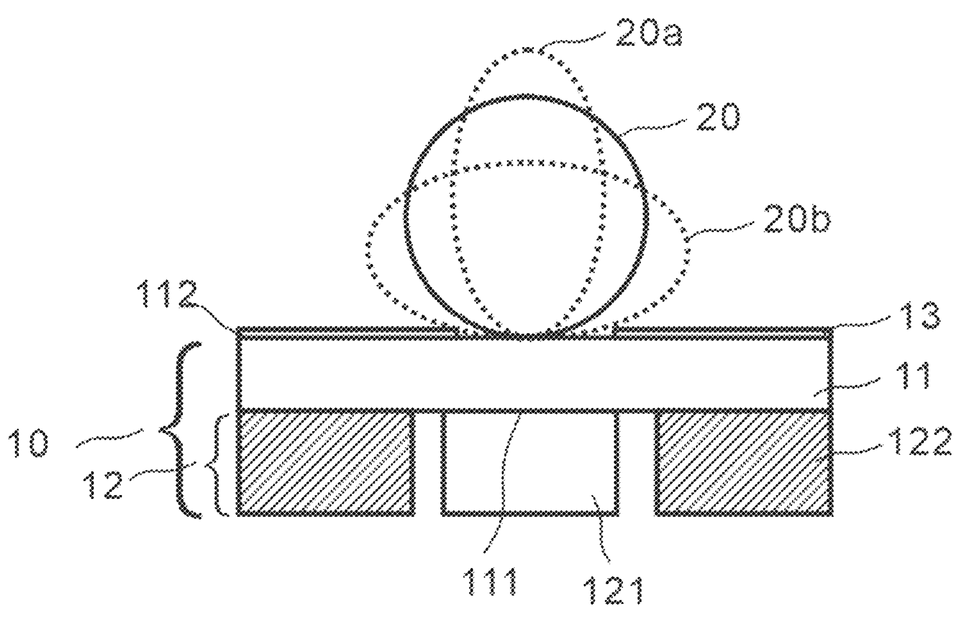
FIG. 1 is a schematic diagram of the longitudinal cross-sectional structure of the opto chip of the present invention.
Figure 2:
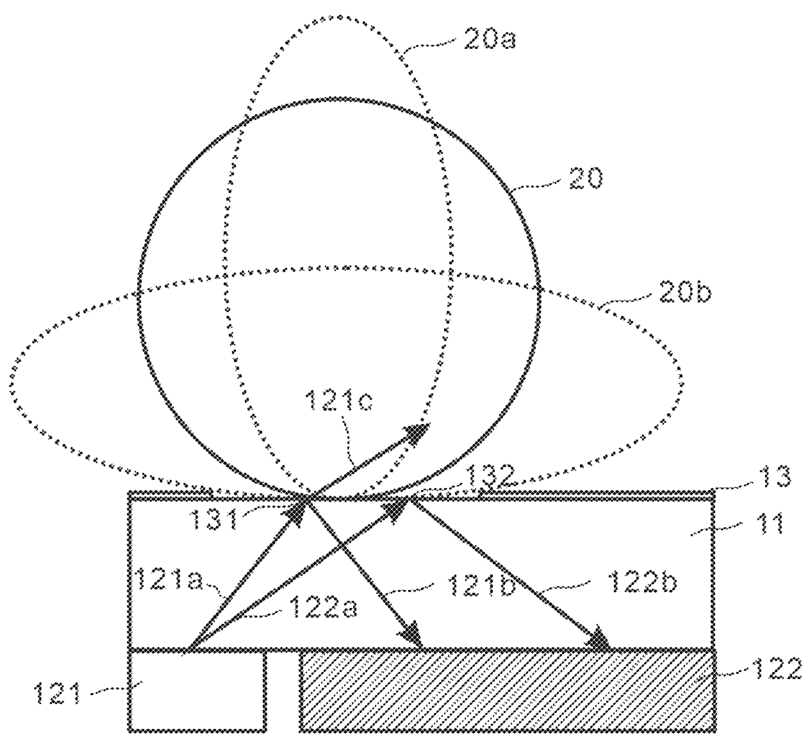
FIG. 2 is a schematic diagram of the optical mechanism in the opto chip of the present invention.
Figure 3:
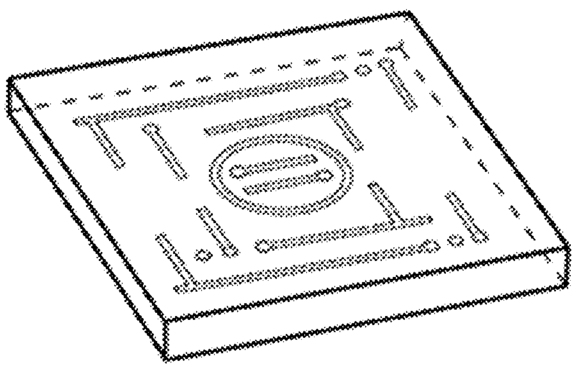
FIG. 3 is a photo of the opto chip prepared in Example 1 of the present invention.

A photograph of the opto chip produced in this example is as shown in FIG. 3, and its plane size is 1×1 mm.

Example 2

Construction of the Detection System

Figure 4:
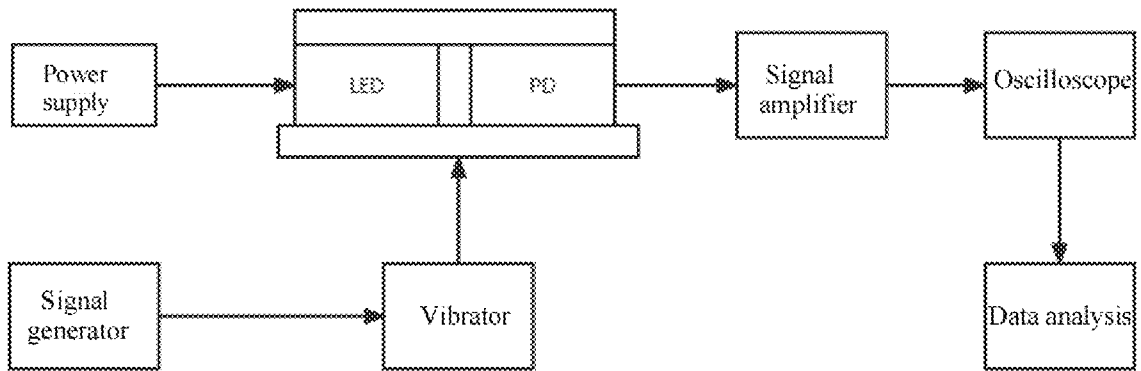
FIG. 4 is a schematic block diagram of the detection system of the present invention constructed in Example 2.

A detection system of the present invention was constructed as shown in FIG. 4.

The opto chip made in Example 1 was supplied with current from a power supply 100 in order to cause the LED 121 to emit light steadily. The vibrator 114 was given a pulse wave by a signal generator 112. The vibrator vibrated at a given frequency, causing the optoelectronic chip on the vibrator together with the droplet on the optoelectronic chip 120 to vibrate. The light emitted from the LED 121 was detected by the PD 122, and the received photocurrent signals were amplified by a signal amplifier 116 and then acquired by an oscilloscope 118. Finally, the acquired signals were analyzed by a computer 130 to obtain the relevant properties of the droplet.

Example 3

Detection of Viscosity, Refractive Index and Resonance Frequency (1) standard solutions of different viscosities were prepared using glycerol and pure water at 25° C.: 1 cp, 2 cp, 4 cp, 6.2 cp, 7.9 cp, 9.8 cp, 12 cp, 14.2 cp, 16 cp, 17.8 cp, 20 cp, 25 cp, 30 cp and 35.4 cp;

(2) the detection system constructed in Example 2 was connected, and the power supply 100 was set to 10 mA constant current;

(3) 6 μl standard solution was aspirated by a micro-sampler;

(4) the liquid was dropped onto the center of the opto chip 120;

(5) the vibrator 114 was given a pulse wave with a voltage amplitude of 1V, a frequency of 0.1 Hz and a duty cycle of 0.1%;

(6) oscilloscope 118 signals were acquired, and the data was processed to obtain the relevant properties of the liquid; and (7) steps (3)-(6) were repeated until all the data to be detected had been obtained.

Characterization and Analysis

For the detection process of Example 3, the following actions were performed.

Figure 5:
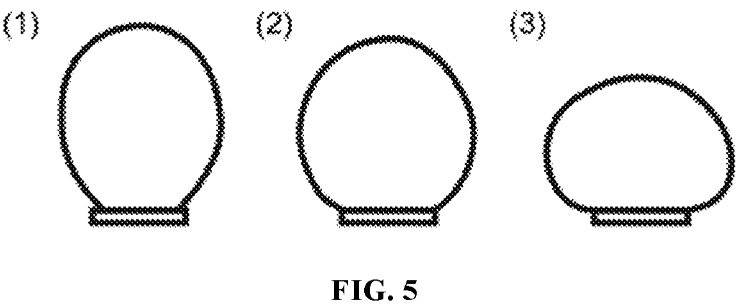
FIG. 5 shows snapshots taken by a high-speed camera showing the vibration motion of the droplet at (1) the highest point, (2) the normal point and (3) the lowest point in Example 3 of the present invention.

(1) For a liquid sample with a viscosity of 2 cp, during the droplet vibration process in step (5) of Example 3, a high-speed camera was used to take photographs of the droplet, as shown in FIG. 5, where: (1) shows the droplet at its highest vertical point; (2) shows the droplet at its normal point or stable point; and (3) shows the droplet at its lowest point.

Figure 6:
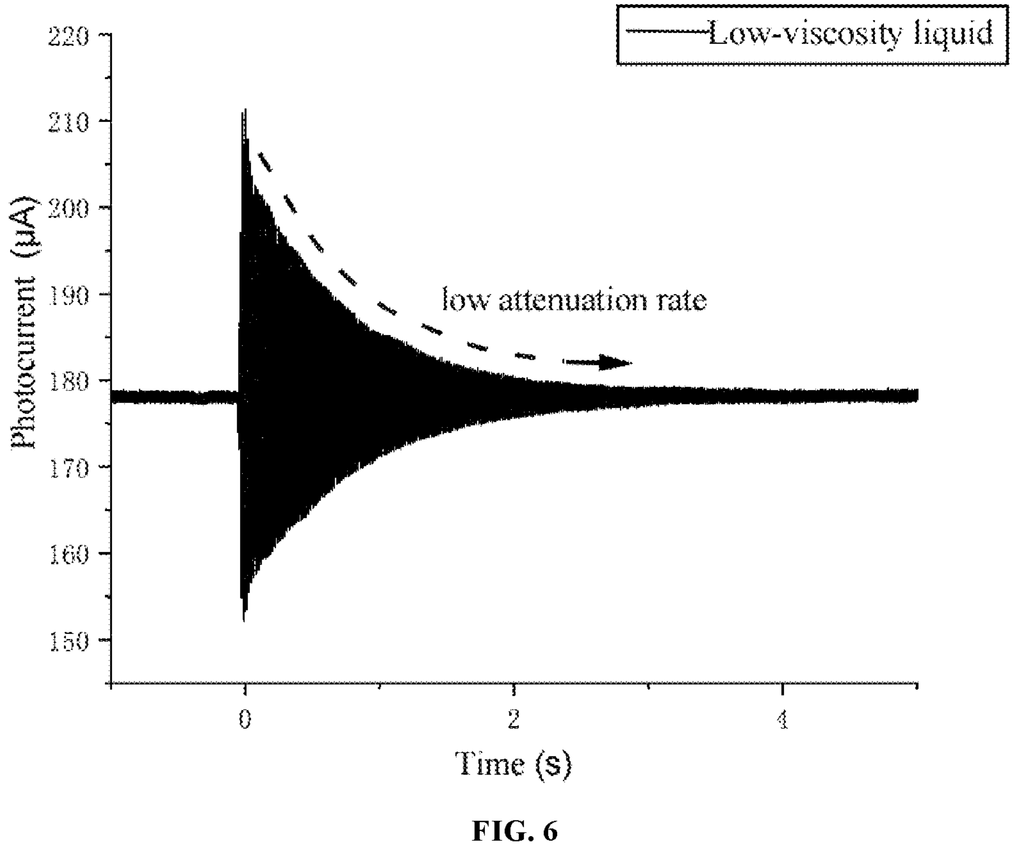
FIG. 6 is a time domain diagram of the photocurrent signals acquired in Example 3 of the present invention.

(2) The time domain diagram of the acquired photocurrent signals was plotted as shown in FIG. 6.

Figure 7:
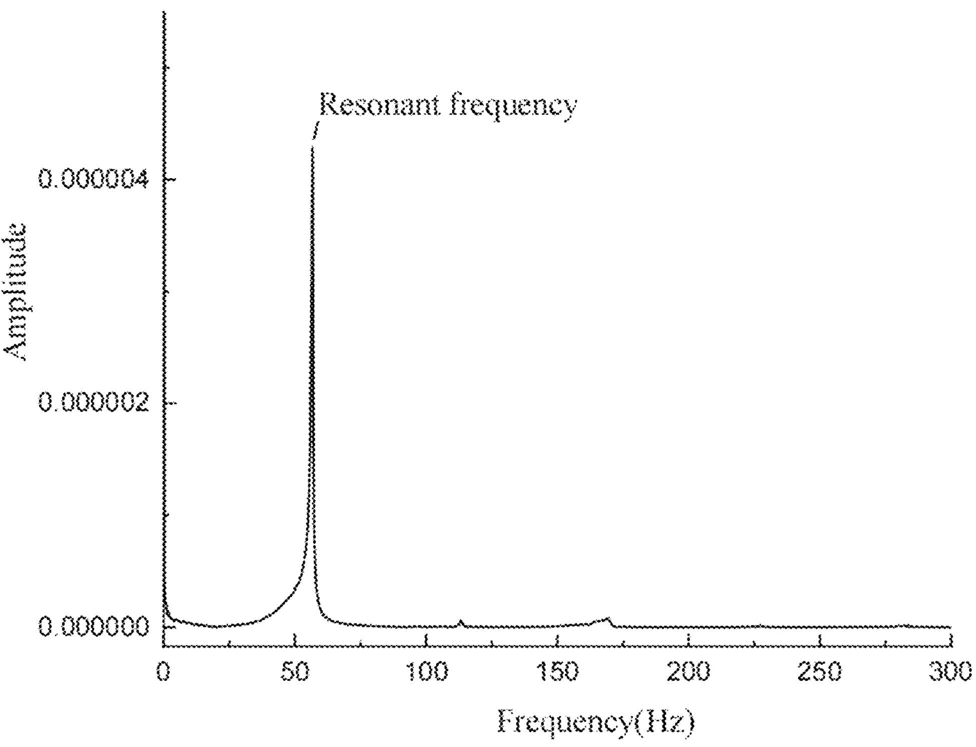
FIG. 7 is a spectrum diagram obtained by subjecting the time domain photocurrent signal shown in FIG. 6 to Fourier transforming as described in in Example 3 of the present invention.

(3) The acquired photocurrent signals were subjected to Fast Fourier transform (FFT transform) as shown in FIG. 7. There is a peak around 52 Hz, which is the resonant frequency of the droplet.

Figure 8:
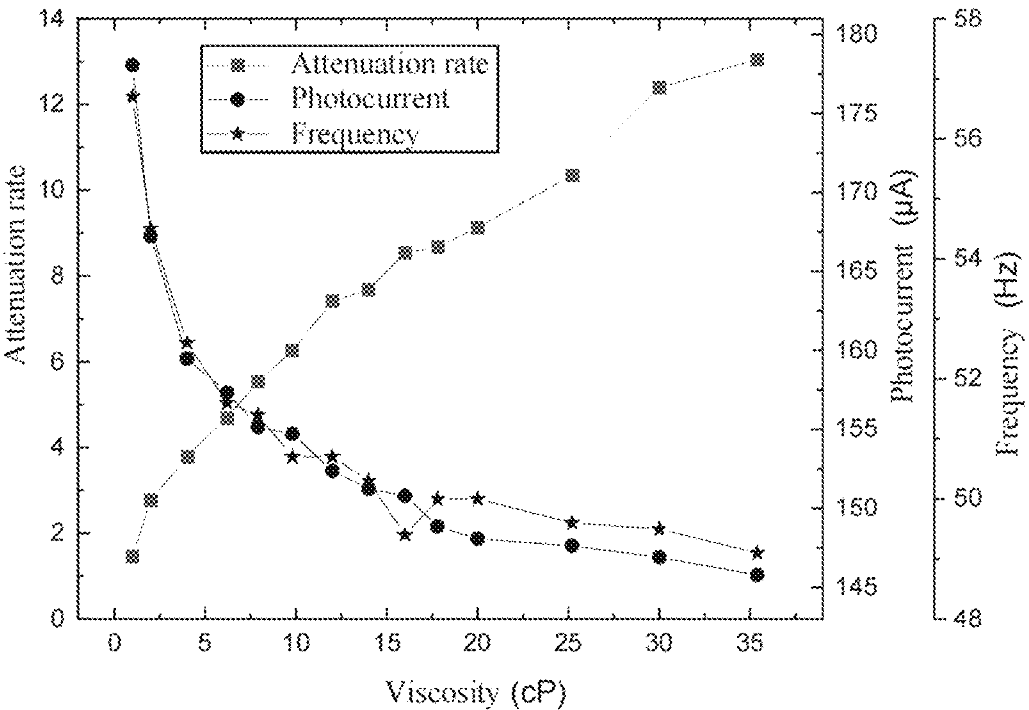
FIG. 8 is a data plot summarizing the viscosity, refractive index and resonance frequency measured using liquid samples of different viscosities.

(4) The data of viscosity, refractive index and resonance frequency measured using liquid samples of different viscosities were summarized in FIG. 8. It can be seen from FIG. 8 that as the glycerol concentration increases, the viscosity and refractive index gradually increase, resulting in a gradual decrease in the first resonance frequency and photocurrent, but a gradual increase in the attenuation rate.

The examples provided above are only preferred embodiments of the present invention, and do not impose any limitation on the present invention. Any equivalent modification or replacement to the technical solutions and contents of this invention made by a person skilled in the art, without departing from the spirit of the present invention, shall still be considered as being within the scope of protection of this invention.

The invention claimed is:

1. An opto chip for detecting a physical parameter of a liquid sample, comprising an optical structure monolithically integrated with a substrate layer and a functional layer, wherein:

the substrate layer is light-transmissive, and is configured to have an upper surface for receiving droplets of the liquid sample and a lower surface bonded to the functional layer; and the functional layer is configured to comprise a light-emitting region and a light-detecting region with the light-emitting region being configured to emit measurement light from an upper surface of the functional layer, and the light-detecting region being configured to receive reflected light derived from the measurement light, wherein a signal of the change in intensity of the reflected light is converted into a photocurrent signal.

2. The opto chip according to claim 1, wherein the opto chip further comprises a support base plate disposed vertically below the functional layer and monolithically integrated with the substrate layer and the functional layer.

3. The opto chip according to claim 1, wherein the light-emitting region is constituted of at least one of a light-emitting diode, a laser diode or a surface-emitting laser; and the light-detecting region is constituted of at least one of a photodiode or a phototransistor.

4. The opto chip according to claim 1, wherein the substrate layer is formed of sapphire or silicon carbide.

5. The opto chip according to claim 1, wherein the light emitting region and the light-detecting region are formed by epitaxial growth on the substrate layer.

6. The opto chip according to claim 1, wherein the substrate layer is sapphire, and the light-emitting region and the light-detecting region are LEDs epitaxially grown on the sapphire substrate layer.

7. The opto chip according to claim 5, wherein the light-emitting region and the light-detecting region are LEDs epitaxially grown simultaneously on the sapphire substrate layer, and processed into two regions by photolithography and/or inductively coupled plasma etching.

8. The opto chip according to claim 1, wherein the physical parameter includes one or more of viscosity, refractive index and resonant frequency.

9. A viscometer, comprising:

the opto chip according to claim 1;

a vibrator for providing vertical vibration to the opto chip; and a photocurrent signal processing module, which is configured to process the photocurrent signals output from the light-detecting region and calculate the viscosity of the droplet.

10. The viscometer according to claim 9, wherein the photocurrent signal processing module is also configured to process the photocurrent signal output from the light-detecting region and calculate the refractive index and/or the resonant frequency of the droplet.

11. The viscometer of claim 9, wherein the vibrator comprises a signal generator for applying pulse waves to the vibrator.

12. A method for detecting the viscosity of liquid, comprising the steps of:

(1) providing the viscometer of claim 9;

(2) dropping the liquid sample to a surface of the opto chip to form the droplet;

(3) applying pulse waves to the vibrator to cause the droplet on the opto chip to vibrate vertically;

(4) acquiring the photocurrent signals output from the light-detecting region during the attenuation of the vibration amplitude of the droplet; and (5) processing the acquired photocurrent signals and calculating the viscosity of the droplet by using the photocurrent signal processing module.

13. The method for detecting the viscosity of the liquid sample according to claim 12, wherein the volume of the droplet of the liquid sample is 5 μl-1 ml, preferably 5-50 μl, and more preferably 5-10 μl.

14. The method for detecting the viscosity of the liquid sample according to claim 12, wherein the viscosity of the liquid sample ranges from 2 to 40 cp.

15. The method for detecting the viscosity of the liquid sample according to claim 12, wherein in step (3), the frequency of the pulse waves applied to the vibrator is 10-1000 mHz; preferably, the voltage amplitude of the pulse waves applied to the vibrator is 0.1-10V; and preferably, the duty cycle of the pulse waves applied to the vibrator is 0.01%-1%.

16. A method for detecting the refractive index of liquid, comprising the steps of:

(1) providing the viscometer of claim 9;

(2) dropping the liquid sample to a surface of the opto chip to form the droplet;

(3) applying pulse waves to the vibrator to cause the droplet on the opto chip to vibrate vertically;

(4) acquiring the photocurrent signals output from the light-detecting region during the attenuation of the vibration amplitude of the droplet; and (5) analyzing the acquired photocurrent signals, and calculating the refractive index of the liquid sample from the photocurrent intensity according to Snell's law.

17. A method for detecting the resonant frequency of liquid, comprising the steps of:

(1) providing the viscometer of claim 9;

(2) dropping the liquid sample to a surface of the opto chip to form the droplet;

(3) applying pulse waves to the vibrator causing the droplet on the opto chip to vibrate vertically;

(4) acquiring the photocurrent signals output from the light-detecting region during the attenuation of the vibration amplitude of the droplet; and (5) subjecting the acquired photocurrent signals to fast Fourier transform to obtain the resonant frequency of the droplets.

* * * * *